(12) United States Patent
Lys et al.

(10) Patent No.: US 7,113,541 B1
(45) Date of Patent: Sep. 26, 2006

(54) METHOD FOR SOFTWARE DRIVEN GENERATION OF MULTIPLE SIMULTANEOUS HIGH SPEED PULSE WIDTH MODULATED SIGNALS

(75) Inventors: Ihor A. Lys, Boston, MA (US); Frederick M. Morgan, Quincy, MA (US)

(73) Assignee: Color Kinetics Incorporated, Boston, MA (US)

( * ) Notice: Subject to any disclaimer, the term of this patent is extended or adjusted under 35 U.S.C. 154(b) by 0 days.

(21) Appl. No.: 09/344,699

(22) Filed: Jun. 25, 1999

Related U.S. Application Data (63) Continuation-in-part of application No. 09/215,624, filed on Dec. 17, 1998, now Pat. No. 6,528,954, and a continuation-in-part of application No. 09/213,537, filed on Dec. 17, 1998, now Pat. No. 6,292,901, and a continuation-in-part of application No. 09/213,607, filed on Dec. 17, 1998, and a continuation-in-part of application No. 09/213,189, filed on Dec. 17, 1998, now Pat. No. 6,459,919, and a continuation-in-part of application No. 09/213,548, filed on Dec. 17, 1998, now Pat. No. 6,166,496, and a continuation-in-part of application No. 09/213,581, filed on Dec. 17, 1998, and a continuation-in-part of application No. 09/213,659, filed on Dec. 17, 1998, now Pat. No. 6,211,626, and a continuation-in-part of application No. 09/213,540, filed on Dec. 17, 1998, and a continuation-in-part of application No. 08/920,156, filed on Aug. 26, 1997, now Pat. No. 6,016,038.

(60) Provisional application No. 60/090,920, filed on Jun. 26, 1998, provisional application No. 60/079,285, filed on Mar. 25, 1998, provisional application No. 60/078,861, filed on Mar. 20, 1998, provisional application No. 60/068,792, filed on Dec. 24, 1997, provisional application No. 60/071,281, filed on Dec. 17, 1997.

(51) Int. Cl.
*H03K 7/08* (2006.01)

(52) U.S. Cl. ............ 375/238; 375/366; 315/151; 315/156; 702/79

(58) Field of Classification Search ............ 375/238, 375/366; 315/308, 291, 151, 316, 370, 156; 702/79, 188; 399/51; 250/205
See application file for complete search history.

(56) References Cited

U.S. PATENT DOCUMENTS 3,746,918 A 7/1973 Drucker et al.

FOREIGN PATENT DOCUMENTS

CA 2134848 11/1998

(Continued)

OTHER PUBLICATIONS

High End Systems, Inc., *Trackspot User Manual*, Aug. 1997, Excerpts (Cover, Title page, pp. ii through iii and 2-13 through 2-14).

(Continued)

*Primary Examiner*—Khai Tran
*Assistant Examiner*—Edith M. Chang
(74) *Attorney, Agent, or Firm*—Wolf, Greenfield & Sacks, P.C.

(57) ABSTRACT

Systems and methods can provide, in one aspect, a method for modulating the pulse width of control signals generated on a plurality of separate channels. In one practice, the methods described herein are suitable for execution on a microprocessor or micro controller platform that includes a timer interrupt mechanism which will generate an interrupt in response to a timer counting down a selected time interval or time period. In one practice, the timer is set to count down a period of time that is representative of a portion, or sub period, of the PWM cycle. Upon expiration of that time period, the timer executes an interrupt that causes the micro controller to enter an interrupt service routine (ISR) that can further modulate the PWM cycle of one or more signals.

40 Claims, 3 Drawing Sheets

U.S. PATENT DOCUMENTS

| | | | |
|---|---|---|---|
| 4,074,319 A | 2/1978 | Goldschmidt et al. | |
| 4,271,408 A | 6/1981 | Teshima et al. | |
| 4,298,869 A | 11/1981 | Okuno | |
| 4,329,625 A | 5/1982 | Nishizawa et al. | |
| 4,339,788 A * | 7/1982 | White et al. | 362/157 |
| 4,342,906 A | 8/1982 | Hyatt | 250/205 |
| 4,367,464 A | 1/1983 | Kurahashi et al. | |
| 4,388,567 A | 6/1983 | Yamazaki et al. | |
| 4,420,711 A | 12/1983 | Takahashi et al. | |
| 4,625,152 A | 11/1986 | Nakai | |
| 4,647,217 A | 3/1987 | Havel | |
| 4,687,340 A | 8/1987 | Havel | |
| 4,705,406 A | 11/1987 | Havel | |
| 4,707,141 A | 11/1987 | Havel | |
| 4,727,289 A | 2/1988 | Uchika | |
| 4,740,882 A | 4/1988 | Miller | |
| 4,771,274 A | 9/1988 | Havel | |
| 4,845,481 A | 7/1989 | Havel | |
| 4,845,745 A | 7/1989 | Havel | |
| 4,857,801 A | 8/1989 | Farrell | |
| 4,870,325 A | 9/1989 | Kazar | |
| 4,887,074 A | 12/1989 | Simon et al. | |
| 4,965,561 A | 10/1990 | Havel | |
| 4,992,704 A | 2/1991 | Stinson | |
| 5,003,227 A | 3/1991 | Nilssen | |
| 5,008,595 A * | 4/1991 | Kazar | 315/178 |
| 5,008,788 A | 4/1991 | Palinkas | |
| 5,036,248 A | 7/1991 | McEwan et al. | |
| 5,038,255 A | 8/1991 | Nishihashi et al. | |
| 5,089,748 A | 2/1992 | Ihms | |
| 5,126,634 A | 6/1992 | Johnson | |
| 5,134,387 A | 7/1992 | Smith et al. | |
| 5,161,879 A | 11/1992 | McDermott | |
| 5,164,715 A | 11/1992 | Kashiwabara et al. | |
| 5,184,114 A | 2/1993 | Brown | |
| 5,226,723 A | 7/1993 | Chen | |
| 5,254,910 A | 10/1993 | Yang | |
| 5,256,948 A | 10/1993 | Boldin et al. | |
| 5,278,542 A | 1/1994 | Smith et al. | |
| 5,282,121 A | 1/1994 | Bornhorst et al. | |
| 5,294,865 A | 3/1994 | Haraden | |
| 5,298,871 A * | 3/1994 | Shimohara | 318/599 |
| 5,350,977 A | 9/1994 | Hamamoto et al. | |
| 5,357,170 A * | 10/1994 | Luchaco et al. | 315/159 |
| 5,374,876 A | 12/1994 | Horibata et al. | |
| 5,375,043 A | 12/1994 | Tokunaga | |
| 5,381,074 A * | 1/1995 | Rudzewicz et al. | 307/10.8 |
| 5,388,357 A | 2/1995 | Malita | |
| 5,404,282 A | 4/1995 | Klinke et al. | |
| 5,406,176 A | 4/1995 | Sugden | |
| 5,410,328 A | 4/1995 | Yoksza et al. | |
| 5,420,482 A | 5/1995 | Phares | |
| 5,436,535 A | 7/1995 | Yang | |
| 5,436,853 A * | 7/1995 | Shimohara | 340/825.63 |
| 5,450,301 A | 9/1995 | Waltz et al. | |
| 5,463,280 A | 10/1995 | Johnson | |
| 5,493,183 A * | 2/1996 | Kimball | 315/156 |
| 5,504,395 A | 4/1996 | Johnson et al. | |
| 5,519,496 A | 5/1996 | Borgert et al. | |
| 5,545,950 A | 8/1996 | Cho | |
| 5,559,681 A | 9/1996 | Duarte | |
| 5,561,346 A | 10/1996 | Byrne | |
| 5,575,459 A | 11/1996 | Anderson | |
| 5,592,051 A | 1/1997 | Korkala | |
| 5,621,282 A | 4/1997 | Haskell | |
| 5,634,711 A | 6/1997 | Kennedy et al. | |
| 5,701,258 A * | 12/1997 | Harris et al. | 340/7.53 |
| 5,712,650 A | 1/1998 | Barlow | |
| 5,751,118 A | 5/1998 | Mortimer | |
| 5,752,766 A | 5/1998 | Bailey et al. | |
| 5,803,579 A | 9/1998 | Turnbull et al. | |
| 5,812,105 A * | 9/1998 | Van de Ven | 345/83 |
| 5,821,685 A | 10/1998 | Vilanilam et al. | |
| 5,836,676 A | 11/1998 | Ando et al. | |
| 5,850,126 A | 12/1998 | Kanbar | |
| 5,854,542 A * | 12/1998 | Forbes | 315/291 |
| 5,896,010 A | 4/1999 | Mikolajczak et al. | |
| 5,907,742 A * | 5/1999 | Johnson et al. | 399/51 |
| 5,924,784 A | 7/1999 | Chliwnyj et al. | |
| 6,016,038 A * | 1/2000 | Mueller et al. | 315/291 |
| 6,020,825 A * | 2/2000 | Chansky et al. | 340/825.22 |
| 6,069,597 A * | 5/2000 | Hansen | 315/169.1 |
| 6,127,783 A | 10/2000 | Pashley et al. | |
| 6,132,072 A | 10/2000 | Turnbull et al. | |
| 6,135,604 A | 10/2000 | Lin | |
| 6,150,774 A | 11/2000 | Mueller et al. | |
| 6,183,086 B1 | 2/2001 | Neubert | |
| 6,183,104 B1 | 2/2001 | Ferrara | |
| 6,184,628 B1 | 2/2001 | Ruthenberg | |
| 6,196,471 B1 | 3/2001 | Ruthenberg | |
| 6,323,832 B1 | 11/2001 | Nishizawa et al. | |
| 6,445,139 B1 | 9/2002 | Marshall et al. | |
| 6,448,550 B1 | 9/2002 | Nishimura | |
| 6,495,964 B1 | 12/2002 | Muthu et al. | |
| 6,586,890 B1 | 7/2003 | Min et al. | |
| 6,596,977 B1 | 7/2003 | Muthu et al. | |
| 6,734,639 B1 | 5/2004 | Chang et al. | |
| 2003/0189412 A1 | 10/2003 | Cunningham | |

FOREIGN PATENT DOCUMENTS

| | | |
|---|---|---|
| DE | 3438154 A1 | 4/1986 |
| DE | 03837313 | 5/1989 |
| DE | 03805998 | 9/1989 |
| DE | 3925767 A1 | 4/1990 |
| DE | 3917101 A1 | 11/1990 |
| DE | 3916875 | 12/1990 |
| DE | 4041338 A1 | 7/1992 |
| DE | 4130576 C1 | 3/1993 |
| DE | 9414689 | 2/1995 |
| DE | 4419006 A1 | 12/1995 |
| DE | 19525897 | 10/1996 |
| DE | 29620583 U1 | 3/1997 |
| DE | 19651140 A1 | 6/1997 |
| DE | 19602891 A1 | 7/1997 |
| EP | 482680 A1 | 4/1992 |
| EP | 567280 B1 | 10/1993 |
| EP | 734082 A2 | 9/1996 |
| EP | 0 752 632 A2 | 1/1997 |
| EP | 1162400 A2 | 12/2001 |
| GB | 2 176 042 | 12/1986 |
| JP | 03045166 | 2/1991 |
| JP | 6 43830 | 2/1994 |
| JP | 9139289 | 5/1997 |
| KR | 1019910009812 | 11/1991 |
| WO | WO 99/06759 | 2/1999 |

OTHER PUBLICATIONS

Artistic License, *AL4000 DMX512 Processors*, Revision 3.4, Jun. 2000, Excerpts (Cover, pp. 7 and 92 through 102).

Case No. 6:02-cv-270-ORL-19JGG in the United States District Court, Middle District of Florida, Orlando Division, Plaintiff's Amended Verified Complaint.

Case No. 6:02-cv-270-ORL-19JGG in the United State District Court, Middle District of Florida, Orlando Division, Defendant's Answer and Counterclaims.

Case No. 6:02-cv-270-ORL-19JGG in the United States District Court, Middle District of Florida, Orlando Division, Plaintiff's Answer to Counterclaims.

Case No. 6:02-cv-270-ORL-19JGG in the United States District Court, Middle District of Florida, Orlando Division, Plaintiff's Answers to Defendant's First Set of Interrogatories w/Exhibit 1.

Case No. 02 CV 11137MEL in the United States District Court, District of Massachusetts, Plaintiff's Complaint and Jury Demand.

Case No. 02 CV 11137MEL in the United States District Court, District of Massachusetts, Defendant's Answer and Affirmative Defenses.

Color Kinetics v. Super Vision International, Inc., "Preliminary Expert Witness Report of Dr. David I. Kennedy Prepared and Submitted on Behalf of Super Vision International, Inc.," United States District Court of Massachusetts Case No. 02 CV 11137 MEL.

G. MacGregor et al., "Solid-State Displays for CRT Replacement in Data Annotation Systems," Optotek Limited, Proceedings, IEEE-SID Conference on Display, Devices and Systems, 1974, Washington, DC, pp. 59-65.

P.G. Wareberg and D.I. Kennedy, "Flat-Panel Video Resolution LED Display System," Optotek Limited, IEEE, 1982, pp. 746-751.

R.J. Spiger, "LED Multifunction Keyboard Engineering Study," Jun. 1983.

D. Effer et al., "Fabrication and Properties of Gallium Phosphide Variable Colour Displays," Jul. 1973.

Opotek Limited, Technical Manual for Multicolor Interactive Switch Module AN-601 and Input Simulator AN-600, Sep. 1986.

Multicolour Pendant, Maplin Magazine, Dec. 1981.

Open Letter to the USPTO, Oct. 14, 2004, http://www.artisticlicense.com/app.notes/appnote027.pdf.

Hewlett Packard Components, "Solid State Display and Optoelectronics Designer's Catalog," pp. 30-43, Jul. 1973.

INTEC Research, Trackspot, http://www.intec-research.com/trackspot.htm, pp. 1-4, Apr. 24, 2003.

SHARP, Optoelectronics Data Book, pp. 1096-1097, 1994/1995.

About DMX-512 Lighting Protocol—Pangolin Laser Systems, pp. 1-4, Apr. 7, 2003.

* cited by examiner

METHOD FOR SOFTWARE DRIVEN GENERATION OF MULTIPLE SIMULTANEOUS HIGH SPEED PULSE WIDTH MODULATED SIGNALS

CROSS-REFERENCE TO RELATED APPLICATIONS

This application claims the benefit under 35 U.S.C. §119 (e) of U.S. Provisional Application Ser. No. 60/090,920, filed Jun. 26, 1998, and entitled *Methods for Software Driven Generation of Multiple Simultaneous High Speed Pulse Width Modulated Signals.*

This application also is a continuation-in-part (CIP) under 35 U.S.C. §120 of, and hence claims priority to and incorporates by reference, U.S. Ser. No. 08/920,156, entitled *Multicolored LED Lighting Method and Apparatus,* U.S. patent application, filed Aug. 26, 1997, naming George Mueller and Ihor Lys as inventors, now U.S. Pat. No. 6,016,038.

This application also is a continuation-in-part (CIP) under 35 U.S.C. §120 of, and hence claims priority to and incorporates by reference, U.S. patent application Ser. No. 09/215,624 filed on Dec. 17, 1998, now U.S. Pat. No. 6,528,954, which in turn claims the benefit of the following U.S. Provisional Applications:

Ser. No. 60/071,281, filed Dec. 17, 1997, entitled "Digitally Controlled Light Emitting Diode Systems and Methods;"

Ser. No. 60/068,792, filed Dec. 24, 1997, entitled "Multi-Color Intelligent Lighting;"

Ser. No. 60/078,861, filed Mar. 20, 1998, entitled "Digitally Lighting Systems;" and Ser. No. 60/079,285, filed Mar. 25, 1998, entitled "System and Method for Controlled Illumination."

This application also is a continuation-in-part (CIP) under 35 U.S.C. §120 of, and hence claims priority to and incorporates by reference, the following applications:

U.S. patent application Ser. No. 09/213,537 filed on Dec. 17, 1998, now U.S. Pat. No. 6,292,901, U.S. patent application Ser. No. 09/213,607 filed on Dec. 17, 1998, U.S. patent application Ser. No. 09/213,189 filed on Dec. 17, 1998, now U.S. Pat. No. 6,459,919, U.S. patent application Ser. No. 09/213,548 filed on Dec. 17, 1998, now U.S. Pat. No. 6,166,496, U.S. patent application Ser. No. 09/213,581 filed on Dec. 17, 1998, U.S. patent application Ser. No. 09/213.659 filed on Dec. 17, 1998, now U.S. Pat. No. 6,211,626, and U.S. patent application Ser. No. 09/213,540 filed on Dec. 17, 1998.

FIELD OF THE INVENTION

This application relates to systems and methods for the generation of pulse width modulated signals for lighting or for other purposes.

BACKGROUND OF THE INVENTION

Pulse width modulation (PWM) is a common technique for controlling the amount of power that is delivered to a device, such as a motor or a lamp. One of the main benefits of PWM is that it is a technique that allows a digital system to achieve relatively high resolution control over the operation of a particular device. For example PWM is a technique commonly employed in motor control to allow a digital signal to control the speed of a motor. Specifically, PWM takes advantage of the fact that a motor is an inductive element that acts like an integrator. Accordingly, the application to that motor of a pulsed digital signal results in the motor integrating over the square wave of the pulsed digital signal. By selecting the proper duty cycle and frequency for the PWM signal with respect to the time response of the particular motor under control, the pulsed signal will appear to the motor as a DC signal at a voltage level that is intermediate between the high and low voltage levels of the pulsed digital power signal. Accordingly, pulse width modulation is a technique that allows a digital output signal to effectively achieve control over a device as if the digital output signal could be set to an intermediate voltage level.

Traditional methods of providing pulse width modulated signals include employing data processing systems that have software timers which control the pulse modulation of a particular output. However, although these systems can work quite well, it is often not cost effective to dedicate a data processing platform to the task of running timer modules for a PWM application.

Other techniques include interrupt driven processes in which a microprocessor, such as one having a watchdog timer, receives periodic interrupts at a known rate. Each time through the interrupt loop the processor updates one or more output pins, thus creating a pulse width modulated signal on each output pin. In this case, the rate at which a signal can be modulated is the clock speed multiplied by the number of cycles in the interrupt routine. For interrupt routines that control multiple channels, the number of instructions in the interrupt routine and therefore the number of clock cycles, can be quite large. Thus, the time period for executing the update instructions can be significant, and the PWM signal may have poor resolution, lacking fine grain control over the system. Still other techniques exist which are effectively combinations of the first two processes, software loops that contain a variable number of instructions for these techniques. The processor uses the hardware timer to generate a periodic interrupt, and then, depending on whether the pulse is to be very short or not, either schedules another interrupt to finish the PWM cycle, or creates the pulse by itself in the first interrupt routine by executing a series of instructions consuming a desired amount of time between two PWM signal updates. The difficulty with this method is that for multiple PWM channels it is very difficult to arrange the timer based signal updates such that they do not overlap, and then to accurately change the update times for a new value of PWM signals.

Accordingly, a method is needed to provide multiple PWM channels without the problems of these traditional methods. Moreover, there is a need to provide a PWM technique that provides fine resolution over multiple channels, and be executed on an inexpensive micro controller or microprocessor platform.

SUMMARY OF THE INVENTION

The present disclosure provides methods and systems to generate multiple channels of pulse width modulated signals for any purpose using software techniques at speeds exceeding those commonly achievable with traditional software synthesis.

In particular, the systems and methods described herein provide, in one aspect, a method for modulating the pulse width of control signals generated on a plurality of separate channels. In one practice, the methods described herein are suitable for execution on a microprocessor or micro controller platform that includes a timer interrupt mechanism which will generate an interrupt in response to a timer counting down a selected time interval or time period. In one practice, the timer is set to count down a period of time that is representative of a portion, or sub period, of the PWM cycle. For example, the timer can be selected to count down one fourth the time period of one PWM cycle. Upon expiration of that time period, the timer executes an interrupt that causes the micro controller to enter an interrupt service routine (ISR).

The ISR can review a set of pre-computed values each of which represents the value for a modulated channel for a specific sub period of the PWM cycle. The ISR can then write to the I/O pins that are associated with the different modulated channels to set the level of the respective PWM signal on each of the I/O pins. The ISR can then determine for that duty cycle which channel is to be further modulated. For example, for a PWM signal that has been subdivided into four sub periods, the ISR can determine that for the first of these sub period, the ISR is to further modulate the PWM signal on the first channel. Similarly, when the ISR occurs during the second sub period, the ISR can modulate the second channel. In any case, once the ISR has determined which channel to modulate the ISR can modify the signal level on the I/O pin associated with that channel, and execute a delay loop to consume the desired amount of time to maintain the channel in its toggled state. Once the delay loop has been completed the ISR can execute another I/O write operation to toggle the modulated signal to its previous state. The ISR can then advance the sub-bookkeeping value to point to the next sub period, and terminate processing. Upon termination of the ISR, the microprocessor or controller platform can go back to normal operation with the timer still being set to trigger upon the lapse of a time interval associated with a sub period of the PWM cycle.

In one practice, the systems and methods described herein provide control systems that allow for the modulation of a lamp that includes a red, green, and blue component. Each color component of the lamp can be associated with a particular channel. Each channel can be separately modulated to control the amount of red, green, or blue in the composite light generated by the lamp. Accordingly, the systems and methods described herein allow for the modulation of the hue of light generated by a colored lamp.

BRIEF DESCRIPTION OF THE FIGURES

The systems and methods of invention will be understood more clearly from a review of certain illustrated embodiments, which include the following.

DETAILED DESCRIPTION OF THE PREFERRED ILLUSTRATED EMBODIMENT

The invention will now be set forth with reference to certain illustrated embodiments, including control systems that allow for the modulation of the hue of colored light generated by a lamp having a red, green and blue component. However, it will be understood by those of ordinary skill in the art that these illustrated embodiments are merely representative of the systems and methods that are provided by the invention and that other embodiments can be realized without departing from the scope of the invention. For example, the systems and methods described herein can further be employed for providing PWM control systems suitable for controlling the operation of a motor, including controlling the speed at which the motor rotates. Further, it will be understood that the systems and methods described herein can be employed for controlling the power delivered to an electronic device, including a traditional incandescent lightbulb, for controlling the brightness at which the light radiates. Other embodiments can be realized, and the actual implementation of these other embodiments can vary depending upon the application at hand.

Figure 1:
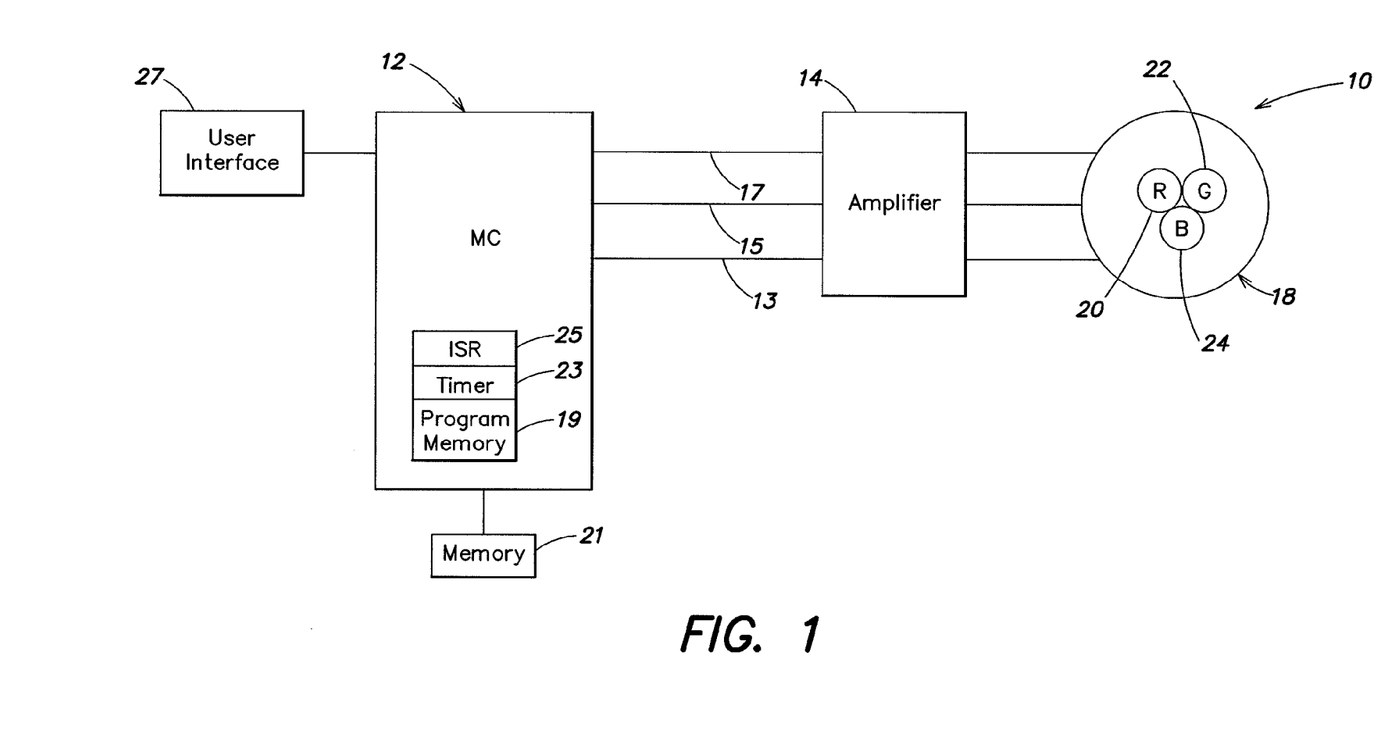
FIG. 1 depicts one embodiment of a system for modulating the hue of light generated by a color lamp.

FIG. 1 depicts one system 10 that includes a microcontroller element 12, an amplifier 14, and a colored light 18 that includes three colored lamps depicted as a red lamp 20, green lamp 22 and blue lamp 24. As shown in FIG. 1, the microcontroller 12 couples to the amplifier 14 via three separate channels. Similarly, the amplifier couples to the lamp 18 via three separate channels. Each of the three channels can be associated with one PWM signal that modulates the operation of a respective one of the colored lamps 20, 22 and 24. Each of the elements depicted in FIG. 1 cooperate to provide a system that can modulate the relative intensities of each of the colored lamps 20, 22 and 24 to control the overall hue of the light generated by the lamp 18.

To this end, the system 10 depicted in FIG. 1 can include a microcontroller 12 that can be a conventional microcontroller such as any of the controllers available commercially including those available from the Microchip Company, including any of the PIC family of microcontrollers including the PICmicro 16CXX/17CXX family of microcontrollers. Alternatively, the system 10 can include a microprocessor that can access an external memory device for receiving instructions for operating as a system according to the invention. It will further be understood that those of ordinary skill in the art that other configurations can be employed for providing a data processing platform capable of implementing the systems and methods described herein. However, it will be understood by those of ordinary skill in the art that the systems and methods described herein provide for low-cost control systems that can be operated on lightweight inexpensive data processing platforms such as one time programmable microcontrollers.

As is generally known, the microcontroller 12 can include I/O pins 13, 15, and 17, each of which can be employed for carrying a control signal, such as the PWM signals described herein. Each I/O pin can provide a channel for one of the colored lamp components 20, 22 and 24.

As also shown in FIG. 1, the system 10 may further include a memory 21 and a user interface 27 associated with the microcontroller 12. Additionally, the microcontroller 12 may include a program memory 19, a timer 23, and an interrupt service routine 25. These features are discussed in further detail below in connection with the other figures and the claims.

To aid in controlling the light 18, the system 10 includes an optional amplifier element 14. The amplifier element 14 can be a power amplifier that amplifies a digital control signal, such as a TTL logic level signal usually having low power. The optional amplifier 14 can act to increase the power level of the signal generated by the microcontroller to provide a signal capable of powering the lamp components 20, 22 and 24. The development of such power amplifiers is well-known in the art, and any suitable power amplifier can be practiced with the systems described herein without departing from the scope hereof. Moreover, it will be understood that the amplifier element 14 is optional and that in some embodiments, no power amplifier will be necessary as the power required to activate either of the lamp components can be sufficiently generated by the microcontroller 12, or by another platform capable of generating the PWM signals. It will further be understood that although the amplifier 14 is depicted as a separate element, the amplifier 14 could be integrated into the lamp component 18. Other suitable modifications to the system 10 for integrating or modifying the system 10 to accommodate the power needs of the devices under control can be practiced herewith without departing from the scope of the invention.

Figure 2:
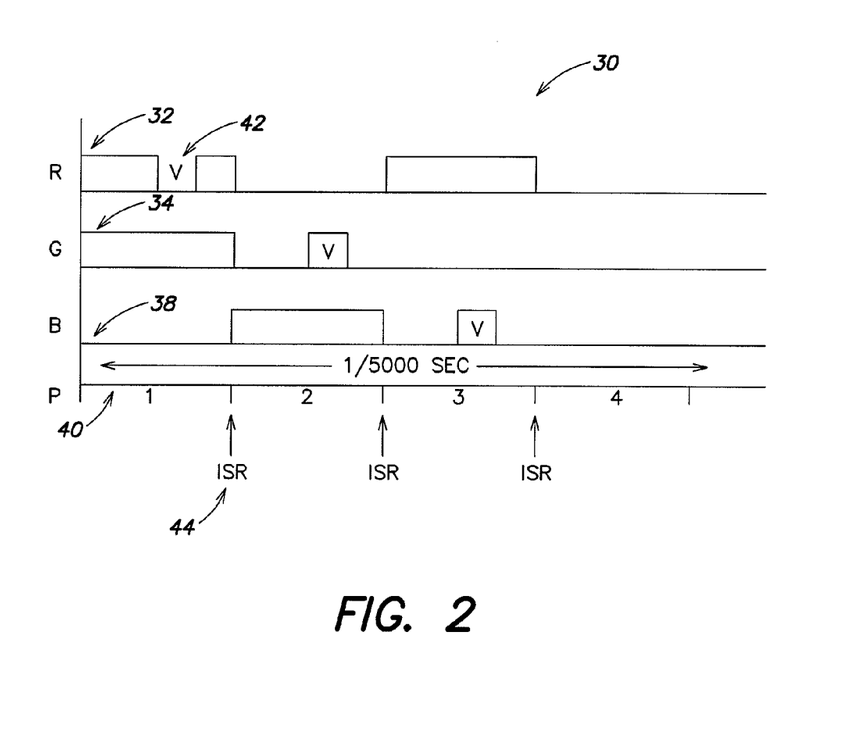
FIG. 2 depicts pictorially one cycle of a PWM signal generated across three separate channels, each channel being associated with one color component of the lamp depicted in FIG. 1.
Figure 3:
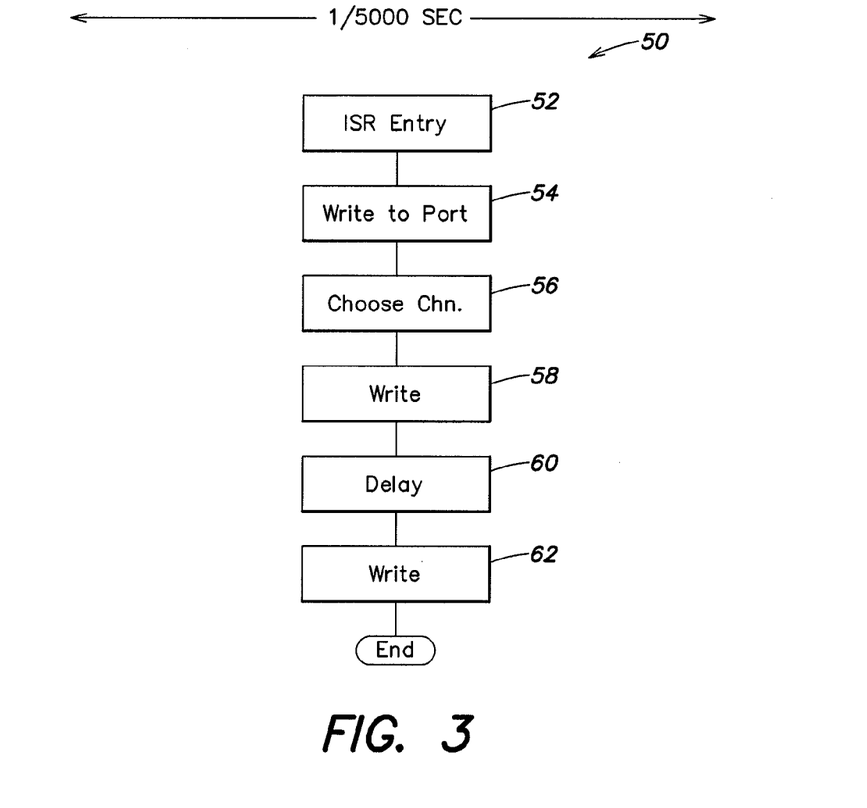
FIG. 3 depicts a flow chart diagram of an interrupt service routine suitable for use with the system depicted in FIG. 1.

FIGS. 2 and 3 depict pictorially the operation of the system 10. Specifically, FIG. 2 depicts the PWM signals that can be generated on the I/O pins of the microcontroller 12. The duty cycles shown in FIG. 2 can be generated, in part, by the action of an interrupt service routine (ISR) that operates, for example, as shown in the flow chart diagram of FIG. 3. Specifically, FIG. 2 shows that a period P can be subdivided into four sub periods, depicted in FIG. 2 as subperiods 1, 2, 3 and 4. The exemplary period of FIG. 2 lasts for about 1/5,000 seconds in length, with each subperiod being substantially one fourth of that duration. The actual duration of the time period will vary according to the application. Moreover, it will be understood that the systems described herein can be employed to generate systems with variable time periods P.

In one practice, the time period for each subperiod can be entered into a watchdog timer within the microcontroller. The watchdog timer can trigger an interrupt each time the subperiod lapses so that an interrupt is generated that causes the microcontroller 12 to enter an ISR associated with the timer interrupt. One such ISR is depicted in FIG. 3. Specifically, FIG. 3 shows an ISR process 50 that begins in a step 52 wherein in response to an interrupt occurring, the microcontroller exits out of its current control program and enters an ISR that is associated with that interrupt and that will be executed until completion.

The design and development of such ISRs is well known in the art and follows from general principals in the art of computer science and embedded systems. In particular, ISR 50 depicted in FIG. 3 includes a number of steps including step 52 wherein the ISR writes to a port, typically understood as an I/O port on the microcontroller. Similarly, in a step 56, the ISR chooses a channel or channels wherein these channels are to be further modulated, as will be described in detail below. The additional modulation takes place by operation of steps 58 through 62 wherein a write operation takes place to toggle the value of the channel and wherein a delay loop maintains the channel in this toggled state for a predetermined or preselected period of time. Once that time period has lapsed, the process 50 can proceed from step 60 to step 62 wherein a further write operation can take place to toggle the channel back to its original value. The steps of the ISR depicted in FIG. 3 will now be describe in more detail with reference to FIG. 2 which depicts the modulation of three PWM channels by a system that includes an ISR process such as the ISR process 50 depicted in FIG. 3.

To generate a plurality of PWM signals, e.g. N PWM signals, the processor of the micro controller can schedule an interrupt of at least N equal sub periods. Each sub period can be associated with a global PWM update procedure, and a vernier update procedure. The sub periods can be denoted by Pi where the first sub period is one, the second is 2 and so on. This is shown in FIG. 2 by the PWM cycle period 40 that shows the PWM cycle as subdivided into four sub periods. Also depicted in FIG. 2 is that the sub period corresponds to the entry of an ISR. This is depicted in FIG. 2 by the demarcations 44 that correspond to the beginning of each of the sub periods.

In each sub period, which begins with an interrupt, the ISR executes a series of operations that modulates the PWM signals of the channels 32, 34 and 38, each of which corresponds to a respective one of the red, green and blue lamps depicted in FIG. 1. To this end, the ISR can update all PWM signals by selecting from a set of pre-computed values corresponding to the specific sub period. This can entail a single array read, followed by a single write to update the multiple I/O pins on which the PWM signals are generated. For example, FIG. 2 show that when the ISR entry occurs at the beginning of sub period 2, each PWM channel can be modified as a function of the pre-computed values. For example, FIG. 2 shows that upon entry into the ISR at the beginning of sub period 2, the system will toggle the values of channels 32, 34 and 38, such that channels 32 and 34 toggle front high to low, and channel 38 toggles from low to high.

In a next step, the ISR can cause the microcontroller to further modulate the signal on a selected one or ones of the PWM channels. In FIG. 2, this further modulation is shown as the toggling of one of the PWM channels for about one fourth of a sub-period. For example, the system in sub period 2 can further modulate the value of the PWM channel 34, such that the value of channel 34 toggles from low to high for about one quarter of the duration of the sub period 2. This further toggling can be described as a "vernier modulation." To accomplish this operation, the system can execute a write to the respective I/O pin or pins, execute a series of instructions consuming the desired amount of time, and then execute another update, typically an I/O write.

This vernier modulation can reduce or increase the PWM "on" of "off" time, by changing the state of the signal for a desired portion of the sub period. There are two possible cases, either the global update places the signal in the "off" state and the vernier routine turns it "on" for a portion of the sub period, or the global update is "on" and the vernier routine turns the signal "off" for a portion of the sub period.

In a subsequent step, the system can advance a sub period bookkeeping value to point to the next sub period, such as for example sub period 3. This positions the system for entering into the ISR upon the next interrupt and modulating the next PWM channel in the series. Using these methods each PWM channel can change multiple times per PWM period. This is advantageous because software can use this property to further increase the apparent PWM frequency, while still maintaining a relatively low interrupt rate.

Figure 4:
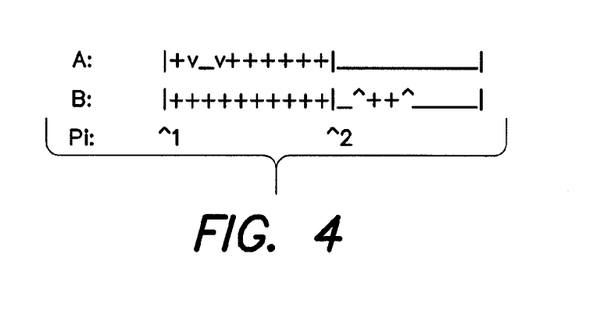
FIG. 4 depicts two PWM channels modulated by an interrupt service routine as shown in FIG. 3.

The methods described herein reduce the amount of processor time employed for controlling the modulation period of the PWM channels. For an example, consider two signals A and B with a resolution of 20 counts programmed to 7 and 14 counts respectively. These signals could be depicted as shown in FIG. 4.

In this example the pre-computed update value at Pi=1 is both signals high, or "on." Signal A then spends some time in the "on" state, while the interrupt service routine continues to execute. Signal A then goes low or "off" in the vernier step at the first "v", and the interrupt service routine executes time delay code during the time before restoring the signal to the on state at the second "v." For the depicted signal A, the vernier occurs for about three counts, including the interrupt time. The actual time between the multiple update at the beginning of the sub period and the vernier update need not be known, so long as the time spent between the vernier updates is the desired time. While the vernier updates are occurring, signal B which was switched on remains on and un-affected. When the second interrupt occurs, both signals are switched off, and the vernier routine now adds four additional counts to the period of signal B. In this example only 7 out of the 20 counts, or 35% of the processor time plus the time required for 2 interrupts, has been consumed.

Since only one vernier period is required per signal generated, increasing the number of periods per PWM cycle can generate non-uniform PWM waveforms at frequencies higher than those possible on most microprocessors' dedicated hardware PWM outputs for a large number of possible output codes. The microprocessor still executes interrupts at fixed intervals.

To change the duty cycles of the signals produced, the process described herein can asynchronously update any or all of the global or vernier values, in any order, without having to synchronize with the ISR, and without stopping the ISR. The ISR does not have to change any variables which the main code changes or vice-versa. Thus there is no need for interlocks of any kind.

This software routine can thus utilize a single timer to generate multiple PWM signals, with each signal having the resolution of a single processor cycle. On a Microchip PIC microprocessor, for example, this allows three PWM signals to be generated with a resolution of 1024 counts, each corresponding to only a single instruction. This allows a PWM period of 1024 instruction cycles, i.e 4882 Hz at a 20 MHZ clock. Furthermore, for counts between 256 and 792 the PWM waveform is a non-uniform 9765 Hz signal, with much lower noise power than the processor's own straight PWM generator. Other processors and controllers can yield other PWM cycles and timing.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method of generating a plurality of pulse width modulated (PWM) signals provided on a corresponding plurality of I/O pins, comprising acts of:
    A) determining said plurality of PWM signals from at least one set of pre-computed values corresponding to a plurality of sub periods of a PWM cycle,
    B) updating at least one of the plurality of PWM signals by executing a first write to at least one of the corresponding plurality of I/O pins,
    C) executing a series of instructions consuming a predetermined amount of time,
    D) executing a second write to the at least one of the corresponding plurality of I/O pins, and
    E) advancing a sub period bookkeeping value to point to a next sub period in the PWM cycle,
    wherein the act B) includes acts of:
        B1) conducting a single array read based on the at least one set of pre-computed values; and
        B2) executing the first write as a single write to the corresponding plurality of I/O pins following the act B1).

2. The method of claim 1, further comprising an act of: repeating at least the acts B) through E) for at least the next sub period in the PWM cycle.

3. The method according to claim 1, further including an act of:
    providing a plurality of sets of pre-computed values, each set corresponding to a particular pattern of modulation.

4. The method according to claim 3, further including an act of:
    allowing a user to select from said plurality of sets of pre-computed values, to provide user control over the plurality of pulse width modulated signals.

5. The method according to claim 1, further including an act of:
    F) coupling said pulse width modulated signals to a plurality of lamps, each lamp corresponding to a different color, whereby an overall perceivable color of light generated by said plurality of lamps is controlled as a function of said pulse width modulated signals.

6. The method of claim 5, wherein the plurality of lamps includes at least one first LED adapted to output at least first radiation having a first spectrum and at least one second LED adapted to output second radiation having a second spectrum different than the first spectrum, and wherein the method further comprises an act of:
    G) independently controlling at least a first intensity of the first radiation and a second intensity of the second radiation based on at least some of the PWM signals so as to controllably vary at least the overall perceivable color of the light generated by the plurality of lamps.

7. The method of claim 6, wherein the act G) includes an act of:
    independently controlling at least the first intensity of the first radiation and the second intensity of the second radiation such that the light provides a single observable color at a given time.

8. The method of claim 6, wherein the act G) includes an act of:
    independently controlling at least the first intensity of the first radiation and the second intensity of the second radiation so as to controllably vary an overall intensity of the light.

9. The method of claim 6, wherein the act G) includes an act of:
    independently controlling at least the first intensity of the first radiation and the second intensity of the second radiation such that the light has a sufficient intensity to effectively illuminate a space.

10. The method of claim 6, wherein the act G) includes an act of:
    independently controlling at least the first intensity of the first radiation and the second intensity of the second radiation so as to produce a dynamic lighting effect as perceived by an observer.

11. The method of claim 6, wherein the plurality of lamps includes at least one third LED adapted to output third radiation having a third spectrum different than the first spectrum and the second spectrum, wherein the act G) includes an act of:
    independently controlling a third intensity of the third radiation using at least one of the PWM signals.

12. The method of claim 11, wherein the at least one first LED, the at least one second LED, and the at least one third LED respectively include at least one red LED, at least one green LED, and at least one blue LED.

13. The method of claim 6, wherein the plurality of lamps is associated with at least one sensor to monitor at least one detectable condition, and wherein the method further includes an act of:

performing the act A) in response to the at least one detectable condition.

14. The method of claim 6, further comprising an act of:

performing the act A) in response to a user operation of at least one user interface.

15. The method of claim 6, further comprising an act of:

performing the act A) in response to at least one control signal received from a network.

16. The method of claim 15, wherein the act A) includes acts of:

a1) receiving at least one addressed network signal including lighting information; and a2) selecting at least one set of pre-computed values based at least in part on the lighting information.

17. The method of claim 16, wherein the act a1) includes an act of:

receiving the at least one addressed network signal based at least in part on a user operation of at least one user interface.

18. The method of claim 16, wherein the at least one addressed network signal includes address information and lighting information for a plurality of illumination apparatus, wherein the plurality of lamps are included in one illumination apparatus of the plurality of illumination apparatus, wherein the one illumination apparatus has a particular address associated therewith, and wherein the act a2) includes an act of:

processing the at least one addressed network signal based on the particular address associated with the one illumination apparatus and the address information in the at least one addressed network signal to recover the lighting information.

19. The method of claim 16, wherein the at least one addressed network signal is formatted using a DMX protocol, and wherein the act a2) includes an act of:

selecting the at least one set of pre-computed values based at least in part on the DMX protocol.

20. A system for modulating a pulse of at least one digital signal, comprising:

a memory having stored therein at least one set of pre-computed values, each pre-computed value being representative of a signal level for said at least one digital signal;

a programmable device having a program memory and a timer, said program memory storing a set of instructions capable of directing said programmable device to monitor said timer, and in response to a signal generated by said timer, to access said set of pre-computed values for selecting at least one signal level for said at least one digital signal;

an interrupt service routine capable of directing said programmable device to further modulate said at least one digital signal;

an amplifier for adjusting a characteristic of said at least one digital signal; and a light source coupled to said at least one digital signal, wherein said at least one digital signal is configured to control at least one operating characteristic of said light source, wherein:

the light source comprises at least one LED-based light source configured to output at least first radiation having a first spectrum and second radiation having a second spectrum different than the first spectrum; and the at least one digital signal includes a plurality of digital signals configured to independently control at least a first intensity of the first radiation and a second intensity of the second radiation so as to controllably vary at least an overall color of a total visible radiation generated by the light source.

21. A system according to claim 20, wherein said programmable device comprises a microcontroller.

22. A system according to claim 20, wherein said programmable device comprises a microprocessor.

23. A system according to claim 20, wherein said interrupt service routine comprises a routine activated in response to a timer interrupt generated by said programmable device.

24. A system according to claim 20, wherein the memory has stored therein a plurality of sets of pre-computed values for said at least one digital signal.

25. A system according to claim 20, further comprising at least one user interface to allow a user to select from among said plurality of sets of pre-computed values and thereby control the at least one digital signal.

26. The system of claim 20, wherein the plurality of digital signals are configured to independently control at least the first intensity of the first radiation and the second intensity of the second radiation such that the total visible radiation generated by the light source represents a single observable color at a given time.

27. The system of claim 20, wherein the plurality of digital signals are configured to independently control at least the first intensity of the first radiation and the second intensity of the second radiation so as to controllably vary an overall intensity of the total visible radiation generated by the light source.

28. The system of claim 20, wherein the plurality of digital signals are configured to independently control at least the first intensity of the first radiation and the second intensity of the second radiation such that the total visible radiation has a sufficient intensity to effectively illuminate a space.

29. The system of claim 20, wherein the plurality of digital signals are configured to independently control at least the first intensity of the first radiation and the second intensity of the second radiation so as to produce a dynamic lighting effect as perceived by an observer.

30. The system of claim 20, wherein the at least one LED-based light source further is configured to output third radiation having a third spectrum different than the first spectrum and the second spectrum, and wherein the plurality of digital signals are configured to independently control a third intensity of the third radiation.

31. The system of claim 30, wherein the at least one LED-based light source includes at least one red LED, at least one green LED, and at least one blue LED.

32. The system of claim 20, further including at least one sensor to monitor at least one detectable condition, wherein the at least one set of pre-computed values is determined in response to the at least one detectable condition.

33. The system of claim 20, further comprising at least one user interface to control the programmable device so as to modulate the plurality of digital signals in response to user operation of the at least one user interface.

34. The system of claim 33, wherein the at least one user interface comprises at least one of at least one potentiometer, a thumb plate, a trackball, a joystick, a switch, and a network interface.

35. The system of claim 20, wherein the programmable device is configured as an addressable programmable device capable of receiving at least one network signal including address information and lighting information.

36. The system of claim 35, wherein the addressable programmable device is configured to generate the plurality of digital signals based at least in part on the lighting information.

37. The system of claim 36, wherein the at least one network signal is provided to the addressable programmable device based at least in part on user operation of at least one user interface in communication with the addressable programmable device.

38. The system of claim 36, wherein the addressable programmable device is configured to process the at least one network signal based on an address of the addressable programmable device and the address information in the network signal to recover the lighting information from the at least one network signal.

39. The system of claim 36, wherein the addressable programmable device has an alterable address.

40. The system of claim 36, wherein the at least one network signal is formatted using a digital multiplex (DMX) protocol, and wherein the addressable programmable device is configured to generate the plurality of digital signals based at least in part on the DMX protocol.

* * * * *